Figure 1:
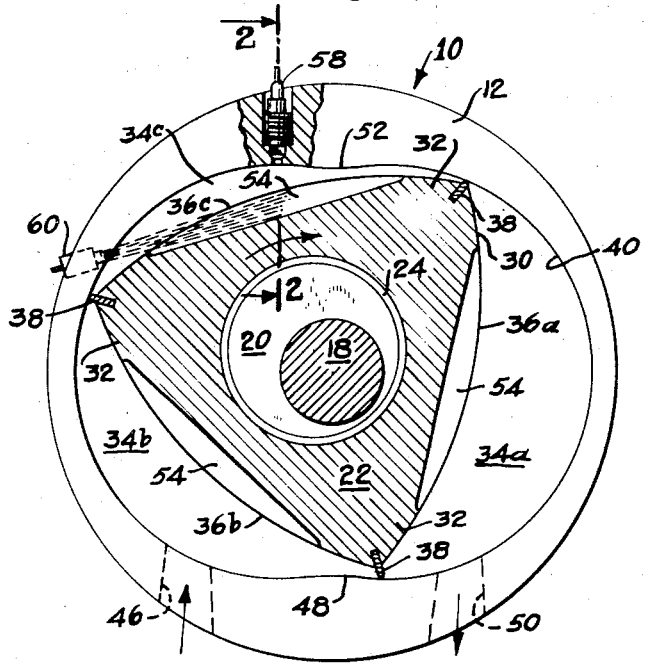

April 12, 1966  W. G. FROEDE ET AL  3,245,388
COMBUSTION MEANS FOR ROTARY COMBUSTION ENGINE
Filed Aug. 19, 1963

INVENTORS
WALTER G. FROEDE
GOTTLIEB WILMERS
BY
ATTORNEY

United States Patent Office 3,245,388
Patented Apr. 12, 1966

3,245,388
COMBUSTION MEANS FOR ROTARY
COMBUSTION ENGINE
Walter G. Froede, Neckarsulm, and Gottlieb Wilmers, Munich, Germany, assignors to NSU Motorenwerke Aktiengesellschaft, Neckarsulm, Germany, and Wankel G.m.b.H., Lindau (Bodensee) Germany
Filed Aug. 19, 1963, Ser. No. 302,959
Claims priority, application Germany, Sept. 5, 1962, N 22,051
7 Claims. (Cl. 123—8)

This invention relates to rotary combustion engines and in particular to a novel structure for providing smooth and efficient combustion in said engines. A rotary combustion engine as described herein may be of the type disclosed in United States Patent 2,988,065 issued to Felix Wankel et al.

In general, engines of this type comprise an outer body formed by a pair of parallel end walls interconnected by a peripheral wall thereby defining a cavity whose peripheral shape preferably is basically an epitrochoid. A rotatably mounted rotor is supported on a shaft within the cavity with the center or rotor axis being eccentric relative to the shaft axis and the outer surface of the rotor defining a plurality of circumferentially-spaced apex portions having radially movable seal strips mounted therein for sealing engagement with the inner surface of the peripheral wall. The relationship between the rotor apex portions and the inner surface of the outer body peripheral wall is such that a plurality of working chambers is formed therebetween which upon relative rotation of the outer body and rotor vary in volume. An intake port is provided for admitting air or a fuel-air mixture to the combustion zone of said engine, an exhaust port is provided for expelling the burnt gases from said engine and an ignition means may be provided for igniting the fuel-air mixture whereupon the stages of intake, compression, expansion and exhaust may be carried out.

As shown in the aforementioned patent, the rotor is generally formed with a multilobed profile with the area between each apex portion of the rotor forming a working face which forms a wall of the variable working chambers of the engine. It is known that the compression ratio of the engine may be varied by altering the surface of the working faces, as for example, by forming a cavity therein. In prior embodiments of rotary combustion engines of the type shown by the aforementioned patent, one such cavity extending substantially the entire width of the rotor has been provided in each working face of the rotor. It has been found however, that when the fuel-air mixture is ignited in a combustion chamber of this type the flame front established by such ignition propagates relatively slowly in an axial direction or along the width of said flame front with the result that the charge is not burnt as rapidly and completely as is desirable. This has been found to be particularly true when using a rotor having a relatively large width. The present invention has for its prime purpose the provisions of a combustion chamber structure and combustion means therefor which will bring about a rapid, complete and efficient burning of the charge therein even when using relatively wide rotors. The invention is generally carried out by providing a plurality of axially-spaced cavities adjacent to one another in each working face of the rotor so that the axial distance or width of the flame front will be limited and a rapid efficient burning will be brought about in each of the combustion chambers formed by each of said cavities and the outer body peripheral wall. A separate ignition means may be provided for each combustion chamber defined by each said cavity and in the case wherein the engine is operated by fuel injection, a separate fuel injection nozzle may also be provided for each of said combustion chambers.

Accordingly it is one object of the invention to provide a novel and improved combustion means for a rotary combustion engine.

Another object of the invention is to provide a novel and improved means providing for relatively rapid and complete burning of the charge in a rotary combustion engine.

A still further object of the invention is to provide a novel and improved combustion chamber structure and means for initiating combustion therein whereby efficient combustion of the charge in said chambers is obtained.

An additional object of the invention is to provide a novel and improved rotor construction wherein each of the rotor working faces serves to define a plurality of combustion chambers with the outer body for improving the combustion characteristics of said engine.

Figure 2:
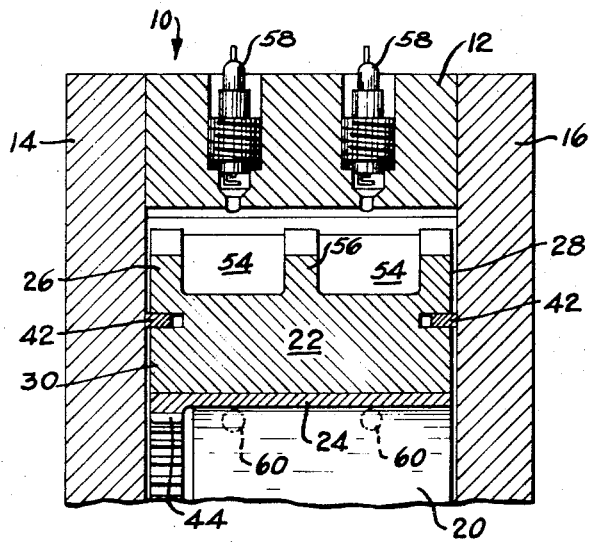

Other objects and advantages of the invention will be apparent upon reading the following detailed description of the invention in connection with the accompanying drawing in which:

FIG. 1 is a transverse view of a rotary combustion engine embodying the invention with one of the end walls removed and the rotor shown in section; and FIG. 2 is a sectional view taken along line 2—2 of FIG. 1.

Referring to FIG. 1, there is shown therein a rotary combustion engine generally designated at 10 which comprises an outer body formed by a peripheral wall 12 interconnected with a pair of end housings 14 and 16. As illustrated, the contour of the inner surface of the peripheral wall 12 has a multilobed profile which preferably is basically a two-lobed epitrochoid. A shaft 18 is rotatably supported within the outer body by suitable bearings (not shown) with said shaft 18 having an eccentric portion 20 formed thereon. Rotatably supported on the eccentric portion 20 is an inner body or rotor 22 with a suitable bearing 24, such as a sleeve-type bearing, interposed therebetween for supporting said rotor on the eccentric portion 20.

The rotor 22 has axially-spaced end faces 26 and 28 disposed adjacent to the outer body end walls 14 and 16 and a rotor peripheral wall 30 having a plurality of circumferentially-spaced apex portions 32, said apex portions preferably being one more in number than the number of said outer body lobes. The rotor apex portions 32 are in continuous engagement with the multilobed inner surface of the outer body peripheral wall to form a plurality (three in the embodiment illustrated) of working chambers 34a, 34b and 34c between said two bodies which vary in volume upon relative rotation of the inner and outer bodies during engine operation. Between its apex portions of the profile of the outer surface of the inner body or rotor 22 is such as to operate in an interference free manner relative to the outer body. Thus, as illustrated, the outer surface of the inner body has a triangular profile with outwardly arched working faces 36a, 36b, and 36c, each said rotor working face forming a wall of its associated working chamber and during rotor rotation said working face approaches and recedes from the peripheral wall 12 of the outer body to vary the volume of its associated working chamber.

In the embodiments illustrated, the outer body 12 is stationary while the inner body 22 is journaled on the eccentric 20 of the shaft 18 which rotates at a ratio of 3:1 with respect to said inner body or rotor 22. During engine operation the rotor 22 has a planetary motion (clockwise in FIG. 1) about the axis of the shaft and outer body whereupon the working chambers 34a, 34b and 34c vary in volume such that in each rotation of the rotor about the axis of the outer body each chamber has two positions of minimum volume and two positions of maximum volume. Seal members 38 are provided in grooves in each of the apex portions 32 of the rotor 22 for sealing engagement with the inner surface 40 of the peripheral wall 12 with said seal members 38 cooperating with seal members 42 in each of the side faces 26 and 28 of the rotor which seal members 42 are in sealing engagement with the inner surfaces of the end walls 14 and 16, thereby forming a continuous seal for each of the working chambers 34a, 34b and 34c. An internally toothed gear 44 is suitably connected to the rotor 22 or may be formed on the sleeve bearing 24, as shown and said gear 44 engages a suitably externally toothed gear fixed to the outer body (not shown) for guiding the rotor in tracing its epitrochoidal path. The gearing may take the form of that illustrated in the abovementioned patent and further reference may be made thereto for more complete description of said gearing.

An intake port 46 is provided in the peripheral wall 12 adjacent one of the lobe junctions 48 for admitting air or a fuel-air mixture to supply the combustion zone of the engine and an exhaust port 50 is provided in the peripheral wall 12 adjacent the opposite side of the lobe junction 48 for expelling the burnt gases from the engine. An ignition means may also be provided adjacent the other of the lobe junctions designated at 52 for igniting the fuel-air mixture, which ignition means will be more clearly described below. Therefore, it can be seen that the stages of intake, compression, expansion and exhaust may be carried out.

As illustrated in the aforementioned patent, each of the working faces of the rotor may be cut out to form a cavity therein for permitting the gases to flow across the lobe portions. These cavities in each of the working faces of said patent extended across substantially the entire width of the rotor with their axial dimensions being defined by the end walls of said rotor. It has been found that, when the fuel-air mixture in each of the working chambers is ignited, the flame front established thereby propagates relatively slowly in an axial direction or in a direction across the width of the rotor. As a result, the burning of the charge in said working chambers is not normally as rapid as desirable and said charge is not always entirely consumed. In accordance with the present invention, however, means are provided for insuring a rapid complete burning of the fuel-air charge in each of the combustion chambers.

As illustrated in the drawings, each working face 36a, 36b and 36c of the rotor 22 is formed with a plurality of adjacent axially-spaced cavities 54 therein, each said cavity having a substantially U-shaped cross-section, there being two such cavities in the embodiment illustrated, with said cavities being defined in the peripheral wall 30 of the rotor between the two rotor end faces 26 and 28. As is shown in FIG. 2, a rib portion 56 formed by the peripheral wall 30 of the rotor separates the two axially-spaced cavities so that as the rotor rotates with respect to the outer body to a position adjacent the lobe portion 52 each cavity forms a substantially separate part of the combustion chamber formed between the working faces of the rotor and the inner surface 40 of the outer body peripheral wall. Each of said cavities 54 may carry a separate fuel-air charge therein for combustion adjacent said lobe portion 52. As further shown in FIG. 2, a pair of spark plugs 58 may be provided for igniting the fuel-air charge in each of the combustion chambers defined by the cavities 54, there being one of said spark plugs 58 for each said cavity 54. Each of the spark plugs 58 is centrally disposed with respect to the side walls of each of the cavities 54 so that separate ignition of the charge in each of the separate parts of the combustion chambers may be brought about.

Instead of supplying fuel-air mixture through the intake port to the working chambers, a separate fuel injection means may be provided for supplying a charge of fuel into the working chambers in the region of the combustion zone of the engine. As shown in the figures the fuel injection means may comprise a fuel injector 60 provided for each of the combustion chambers defined by each of the cavities 54 with said fuel injector nozzles 60 being located in the outer body peripheral wall 12 and disposed so that the fuel is injected with the axis of the fuel spray being substantially centrally disposed with respect to the side walls of the cavities 54. Suitable well known means may be provided for initiating the injection of the fuel charge, such as a timing cam and pump for supplying fuel to the injector nozzles at a timed sequence. When the engine is operating under substantially full load with the nozzles 60 positioned in the peripheral wall 12, as illustrated in FIG. 1, the period of injection for each of the working chambers begins substantially when the cavities approach the region of the injector nozzles with respect to the direction of rotor rotation and is terminated substantially when the axis of the fuel spray is parallel to the radially inner wall of each of the cavities 54 or preferably in the region of the top dead center position of each of the working chambers. When the engine is operating under part load the period of injection of the fuel charge may be shortened or one of the injectors 60 with its associated spark plug 58 may be completely cut off so that in the latter case the engine operates with combustion being carried out in substantially only one of the cavities 54. By this means the usage of air can be increased relative to the usage of fuel and therefore the fuel consumption will be reduced.

From the above description it will be apparent that a novel and improved means of combustion is provided for improving the burning of the charge so that a rapid and complete consumption of the charge will be brought about. By means of the distribution of the fuel-air charge into two partial charges, each of which becomes ignited by its own spark plug, the axial dimension or width of the flame front is reduced due to the axial limitations of each of the cavities 54 upon said charge. Also, by means of injecting the fuel separately into each of the cavities, the fuel will be concentrated in each of the separate parts of the combustion chambers and a layering of the charge is brought about from the front of each combustion chamber to its rear so that the burning will be smooth and continuous.

While the invention has been set forth in detail in the above description it should be understood that the invention is not to be limited by the specific details set forth therein and that various modifications and changes may be made by those skilled in the art without departing from the spirit and scope of the invention as defined in the following claims.

What is claimed is:

1. A rotary combustion engine comprising an outer body having a pair of spaced end walls and a peripheral wall disposed between the end walls to form a cavity therebetween having an axis along which the end walls are spaced and with the inner surface of said peripheral wall having a multilobed profile; a shaft coaxial with the outer body cavity and having an eccentric portion; a rotor having a pair of spaced end walls interconnected by a peripheral wall disposed within the cavity and rotatably supported on the shaft eccentric portion, said rotor having a plurality of apex portions and a rotor working face formed on said rotor between each adjacent pair of apex portions with said apex portions having sealing cooperation with the inner surface of said outer body peripheral wall to form a plurality of working chambers between said rotor apex portions and the inner surface of said outer body peripheral wall which upon relative rotation of said rotor and said outer body vary in volume; intake means for admitting air into said working chambers for combustion therein adjacent one junction of the lobes of said peripheral wall inner surface and exhaust means for expelling the burnt gases from said engine; and each working face of said rotor having a plurality of adjacent axially-spaced parallel cavities formed therein between said rotor end walls such that each cavity forms a part of the combustion space during combustion in a working chamber; and a plurality of spark plugs mounted within the outer body, there being one such spark plug for each said cavity in a working space of said rotor for initiating combustion therein.

2. A rotary combustion engine as recited in claim 1 wherein two said cavities are formed in each working face of said rotor with said cavities being separated by a central rib portion formed by said rotor peripheral wall and having side rail portions formed by said rotor end walls defining axial limits for said cavities at each side of said rotor.

3. A rotary combustion engine as recited in claim 1 wherein each said spark plug is centrally disposed with respect to the side walls of its associated cavity and at least one of said spark plugs capable of being rendered inoperative during part load operation of said engine.

4. A rotary combustion engine as recited in claim 1 further comprising fuel injection means including a fuel injection nozzle located in a recess in said outer body peripheral wall, there being one such fuel injection nozzle for each said cavity in a working face of said rotor, with each said fuel injection nozzle being centrally disposed with respect to the side walls of its associated cavity and at least one of said fuel injection nozzles capable of being rendered inoperative during part load operation of said engine.

5. A rotary combustion engine as recited in claim 4 wherein said fuel injection nozzles are positioned in said outer body peripheral wall such that fuel is sprayed into said cavities in a direction toward said one lobe junction.

6. A rotor for use in a rotary combustion engine comprising an outer body having a pair of spaced end walls and a peripheral wall disposed between the end walls to form a cavity therein for receiving a rotor for rotation about an axis spaced from but parallel to the outer body axis; said rotor having a plurality of circumferentially-spaced apex portions forming a working face on the peripheral surface of said rotor between each adjacent pair of said apex portions and each working face being formed with a plurality of adjacent substantially U-shaped axially-spaced parallel cavities therein whereby a combustible charge may be carried in at least one of said cavities in each working face for ignition therein to produce relative motion of said rotor.

7. A rotor for use in a rotary combustion engine as recited in claim 6 wherein there are two said cavities formed in each working face of said rotor and said cavities being separated by a central rib portion formed by said rotor peripheral surface and having side rail portions of said rotor defining axial limits for said cavities at each side of said rotor.

References Cited by the Examiner

UNITED STATES PATENTS 1,778,182   10/1930   Bullington.

SAMUEL LEVINE, *Primary Examiner*.